US009313007B2

(12) United States Patent
Kudo et al.

(10) Patent No.: US 9,313,007 B2
(45) Date of Patent: Apr. 12, 2016

(54) WIRELESS APPARATUS AND TRAINING SIGNAL TRANSMISSION METHOD

(71) Applicant: NIPPON TELEGRAPH AND TELEPHONE CORPORATION, Tokyo (JP)

(72) Inventors: Riichi Kudo, Yokosuka (JP); Yusuke Asai, Yokosuka (JP); Tomoki Murakami, Yokosuka (JP); Koichi Ishihara, Yokosuka (JP); Masato Mizoguchi, Yokosuka (JP)

(73) Assignee: Nippon Telegraph Telephone Corporation, Tokyo (JP)

( * ) Notice: Subject to any disclaimer, the term of this patent is extended or adjusted under 35 U.S.C. 154(b) by 71 days.

(21) Appl. No.: 14/372,643

(22) PCT Filed: Jan. 23, 2013

(86) PCT No.: PCT/JP2013/051335
§ 371 (c)(1),
(2) Date: Jul. 16, 2014

(87) PCT Pub. No.: WO2013/111784
PCT Pub. Date: Aug. 1, 2013

(65) Prior Publication Data
US 2014/0376355 A1 Dec. 25, 2014

(30) Foreign Application Priority Data
Jan. 27, 2012 (JP) ................................. 2012-015917

(51) Int. Cl.
H04J 11/00 (2006.01)
H04W 4/00 (2009.01)
(Continued)

(52) U.S. Cl.
CPC ............ *H04L 5/0053* (2013.01); *H04B 7/0456* (2013.01); *H04B 7/068* (2013.01);
(Continued)

(58) Field of Classification Search
CPC .... H04B 7/0456; H04B 7/0617; H04B 7/068; H04B 7/0434; H04J 11/003; H04L 5/0053; H04L 25/03343; H04W 72/0453
See application file for complete search history.

(56) References Cited

U.S. PATENT DOCUMENTS

2003/0218973 A1* 11/2003 Oprea .................. H04B 7/0434
370/210
2004/0190636 A1* 9/2004 Oprea .................. H04B 7/0417
375/260
(Continued)

FOREIGN PATENT DOCUMENTS

EP 1 981 198 A1 10/2008
EP 2099232 A1 9/2009
(Continued)

OTHER PUBLICATIONS

Extended Search Report, European Patent Application No. 13740940.5, Jul. 30, 2015.
(Continued)

*Primary Examiner* — Melanie Jagannathan
(74) *Attorney, Agent, or Firm* — Harness, Dickey & Pierce, P.L.C.

(57) ABSTRACT

The number of OFDM symbols for channel estimation is reduced, overhead due to a pilot signal and a feedback signal is reduced, and the throughput is improved. A wireless apparatus is provided with: an iterative coefficient setting unit which sets, for a plurality of transmission ports, an iterative coefficient representing the number of transmission ports which share a plurality of frequency channels of training signals for estimating the channel information; a training signal generating unit which allocates frequency channels to each transmission port so as to satisfy the set iterative coefficient and generates L training signals based on the allocated frequency channels; a channel information acquiring unit which acquires channel information estimated from the training signals from a communication partner for the frequency channels allocated to each transmission port; and a channel information interpolating unit which interpolates channel information of a remaining frequency channel other than the frequency channels allocated to each transmission port from the acquired channel information.

9 Claims, 11 Drawing Sheets

(51) Int. Cl.
*H04B 7/216* (2006.01)
*H04L 5/00* (2006.01)
*H04B 7/04* (2006.01)
*H04B 7/06* (2006.01)
*H04W 72/04* (2009.01)
*H04L 25/02* (2006.01)
*H04W 88/08* (2009.01)

(52) U.S. Cl.
CPC ........... *H04B 7/0617* (2013.01); *H04B 7/0684* (2013.01); *H04J 11/003* (2013.01); *H04W 72/0453* (2013.01); *H04L 5/0023* (2013.01); *H04L 5/0048* (2013.01); *H04L 25/0204* (2013.01); *H04L 25/0226* (2013.01); *H04L 25/0232* (2013.01); *H04W 88/08* (2013.01)

(56) References Cited

U.S. PATENT DOCUMENTS

| | | | | |
|---|---|---|---|---|
| 2004/0192218 | A1* | 9/2004 | Oprea | H04L 25/03343 455/73 |
| 2005/0286651 | A1 | 12/2005 | Egashira et al. | |
| 2009/0058724 | A1* | 3/2009 | Xia | H01Q 3/2605 342/368 |
| 2009/0121935 | A1* | 5/2009 | Xia | H01Q 3/2605 342/377 |
| 2012/0033571 | A1* | 2/2012 | Shimezawa | H04B 7/026 370/252 |
| 2012/0300867 | A1* | 11/2012 | Chen | H04B 7/0456 375/267 |

FOREIGN PATENT DOCUMENTS

| | | |
|---|---|---|
| EP | 2 725 731 A1 | 4/2014 |
| JP | 2006-014234 A | 1/2006 |
| JP | 2008-125027 A | 5/2008 |
| JP | 2010-021922 A | 1/2010 |
| WO | WO-2008/081857 A1 | 7/2008 |
| WO | 2009/114631 A1 | 9/2009 |

OTHER PUBLICATIONS

International Search Report for PCT/JP2013/051335, ISA/JP, mailed Apr. 16, 2013 with translation thereof.
IEEE, "Proposed Specification Framework for TGac," doc.: IEEE 802.11-09/0992r21, Jan. 2011.
IEEE, "IEEEP802.il REVmb/D8.0," pp. 1597 and 1606, Mar. 2011.
IEEE, "IEEE P802.11n/D11.0," pp. 55 to 57, Jun. 2009.

* cited by examiner

| Ch. | P-LTF 20-2-1 | P-LTF 20-2-2 | ... | P-LTF 20-2-L |
|---|---|---|---|---|
| 1 | Tx1 | Tx3 | ... | Tx(2L-1) |
| 2 | Tx2 | Tx4 | ... | Tx2L |
| 3 | Tx1 | Tx3 | ... | Tx(2L-1) |
| 4 | Tx2 | Tx4 | ... | Tx2L |
| 5 | Tx1 | Tx3 | ... | Tx(2L-1) |
| 6 | Tx2 | Tx4 | ... | Tx2L |
| 7 | Tx1 | Tx3 | ... | Tx(2L-1) |
| 8 | Tx2 | Tx4 | ... | Tx2L |
| 9 | Tx1 | Tx3 | ... | Tx(2L-1) |
| 10 | Tx2 | Tx4 | ... | Tx2L |
| 11 | Tx1 | Tx3 | ... | Tx(2L-1) |
| 12 | Tx2 | Tx4 | ... | Tx2L |
| 13 | Tx1 | Tx3 | ... | Tx(2L-1) |
| 14 | Tx2 | Tx4 | ... | Tx2L |
| 15 | Tx1 | Tx3 | ... | Tx(2L-1) |
| 16 | Tx2 | Tx4 | ... | Tx2L |

FIG. 3

| Ch. | P-LTF 20-2-1 | P-LTF 20-2-2 | P-LTF 20-2-3 | P-LTF 20-2-4 |
|---|---|---|---|---|
| 1 | Tx1 | Tx3 | Tx5 | Tx8 |
| 2 | Tx2 | Tx4 | Tx6 | Tx9 |
| 3 | Tx1 | Tx3 | Tx5 | Tx10 |
| 4 | Tx2 | Tx4 | Tx7 | Tx11 |
| 5 | Tx1 | Tx3 | Tx5 | Tx8 |
| 6 | Tx2 | Tx4 | Tx6 | Tx9 |
| 7 | Tx1 | Tx3 | Tx5 | Tx10 |
| 8 | Tx2 | Tx4 | Tx7 | Tx11 |
| 9 | Tx1 | Tx3 | Tx5 | Tx8 |
| 10 | Tx2 | Tx4 | Tx6 | Tx9 |
| 11 | Tx1 | Tx3 | Tx5 | Tx10 |
| 12 | Tx2 | Tx4 | Tx7 | Tx11 |
| 13 | Tx1 | Tx3 | Tx5 | Tx8 |
| 14 | Tx2 | Tx4 | Tx6 | Tx9 |
| 15 | Tx1 | Tx3 | Tx5 | Tx10 |
| 16 | Tx2 | Tx4 | Tx7 | Tx11 |

FIG. 4

| Ch. | VP-LTF 21-2-1 | VP-LTF 21-2-2 | VP-LTF 21-2-3 | VP-LTF 21-2-4 |
|---|---|---|---|---|
| 1 | Tx1 | Tx3 | Tx5 | Tx7 |
| 2 | Tx2 | Tx4 | Tx6 | Tx8 |
| 3 | Tx1 | Tx3 | Tx5 | Tx7 |
| 4 | Tx2 | Tx4 | Tx6 | Tx8 |
| 5 | Tx1 | Tx3 | Tx5 | Tx7 |
| 6 | Tx2 | Tx4 | Tx6 | Tx8 |
| 7 | Tx1 | Tx3 | Tx5 | Tx7 |
| 8 | Tx2 | Tx4 | Tx6 | Tx8 |
| 9 | Tx1 | Tx3 | Tx5 | Tx7 |
| 10 | Tx2 | Tx4 | Tx6 | Tx8 |
| 11 | Tx1 | Tx3 | Tx5 | Tx7 |
| 12 | Tx2 | Tx4 | Tx6 | Tx8 |
| 13 | Tx1 | Tx3 | Tx5 | Tx7 |
| 14 | Tx2 | Tx4 | Tx6 | Tx8 |
| 15 | Tx1 | Tx3 | Tx5 | Tx7 |
| 16 | Tx2 | Tx4 | Tx6 | Tx8 |

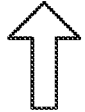

| Ch. | P-LTF 20-2-1 | P-LTF 20-2-2 | P-LTF 20-2-3 | P-LTF 20-2-4 |
|---|---|---|---|---|
| 1 | Tx1+3+5+7 | Tx1-3+5-7 | Tx1+3-5-7 | Tx1-3-5+7 |
| 2 | Tx2+4+6+8 | Tx2-4+6-8 | Tx2+4-6-8 | Tx2-4-6+8 |
| 3 | Tx1+3+5+7 | Tx1-3+5-7 | Tx1+3-5-7 | Tx1-3-5+7 |
| 4 | Tx2+4+6+8 | Tx2-4+6-8 | Tx2+4-6-8 | Tx2-4-6+8 |
| 5 | Tx1+3+5+7 | Tx1-3+5-7 | Tx1+3-5-7 | Tx1-3-5+7 |
| 6 | Tx2+4+6+8 | Tx2-4+6-8 | Tx2+4-6-8 | Tx2-4-6+8 |
| 7 | Tx1+3+5+7 | Tx1-3+5-7 | Tx1+3-5-7 | Tx1-3-5+7 |
| 8 | Tx2+4+6+8 | Tx2-4+6-8 | Tx2+4-6-8 | Tx2-4-6+8 |
| 9 | Tx1+3+5+7 | Tx1-3+5-7 | Tx1+3-5-7 | Tx1-3-5+7 |
| 10 | Tx2+4+6+8 | Tx2-4+6-8 | Tx2+4-6-8 | Tx2-4-6+8 |
| 11 | Tx1+3+5+7 | Tx1-3+5-7 | Tx1+3-5-7 | Tx1-3-5+7 |
| 12 | Tx2+4+6+8 | Tx2-4+6-8 | Tx2+4-6-8 | Tx2-4-6+8 |
| 13 | Tx1+3+5+7 | Tx1-3+5-7 | Tx1+3-5-7 | Tx1-3-5+7 |
| 14 | Tx2+4+6+8 | Tx2-4+6-8 | Tx2+4-6-8 | Tx2-4-6+8 |
| 15 | Tx1+3+5+7 | Tx1-3+5-7 | Tx1+3-5-7 | Tx1-3-5+7 |
| 16 | Tx2+4+6+8 | Tx2-4+6-8 | Tx2+4-6-8 | Tx2-4-6+8 |

FIG. 5

| Ch. | 21-2-1 VP-LTF | 21-2-2 VP-LTF | 21-2-3 VP-LTF | 21-2-4 VP-LTF |
|---|---|---|---|---|
| 1 | Tx1 | Tx3 | Tx5 | Tx8 |
| 2 | Tx2 | Tx4 | Tx6 | Tx9 |
| 3 | Tx1 | Tx3 | Tx5 | Tx10 |
| 4 | Tx2 | Tx4 | Tx7 | Tx11 |
| 5 | Tx1 | Tx3 | Tx5 | Tx8 |
| 6 | Tx2 | Tx4 | Tx6 | Tx9 |
| 7 | Tx1 | Tx3 | Tx5 | Tx10 |
| 8 | Tx2 | Tx4 | Tx7 | Tx11 |
| 9 | Tx1 | Tx3 | Tx5 | Tx8 |
| 10 | Tx2 | Tx4 | Tx6 | Tx9 |
| 11 | Tx1 | Tx3 | Tx5 | Tx10 |
| 12 | Tx2 | Tx4 | Tx7 | Tx11 |
| 13 | Tx1 | Tx3 | Tx5 | Tx8 |
| 14 | Tx2 | Tx4 | Tx6 | Tx9 |
| 15 | Tx1 | Tx3 | Tx5 | Tx10 |
| 16 | Tx2 | Tx4 | Tx7 | Tx11 |

| Ch. | 20-2-1 P-LTF | 20-2-2 P-LTF | 20-2-3 P-LTF | 20-2-4 P-LTF |
|---|---|---|---|---|
| 1 | Tx1+3+5+8 | Tx1+3+5+8 | Tx1+3+5+8 | Tx1-3-5+8 |
| 2 | Tx2+4+6+9 | Tx2+4+6+9 | Tx2+4+6+9 | Tx2-4-6+9 |
| 3 | Tx1+3+5+10 | Tx1+3+5+10 | Tx1+3+5-10 | Tx1-3-5+10 |
| 4 | Tx2+4+7+11 | Tx2+4+7+11 | Tx2+4+7-11 | Tx2-4-7+11 |
| 5 | Tx1+3+5+8 | Tx1+3+5+8 | Tx1+3-5+8 | Tx1-3+5+8 |
| 6 | Tx2+4+6+9 | Tx2+4+6+9 | Tx2+4-6+9 | Tx2-4+6+9 |
| 7 | Tx1+3+5-10 | Tx1+3+5-10 | Tx1+3-5-10 | Tx1-3+5-10 |
| 8 | Tx2+4+7-11 | Tx2+4+7-11 | Tx2+4-7-11 | Tx2-4+7-11 |
| 9 | Tx1+3+5+8 | Tx1+3-5+8 | Tx1-3+5+8 | Tx1+3-5+8 |
| 10 | Tx2+4+6+9 | Tx2+4-6+9 | Tx2-4+6+9 | Tx2+4-6+9 |
| 11 | Tx1+3+5-10 | Tx1+3-5-10 | Tx1-3+5-10 | Tx1+3-5-10 |
| 12 | Tx2+4+7-11 | Tx2+4-7-11 | Tx2-4+7-11 | Tx2+4-7-11 |
| 13 | Tx1+3-5+8 | Tx1-3+5+8 | Tx1-3-5+8 | Tx1-3-5+8 |
| 14 | Tx2+4-6+9 | Tx2-4+6+9 | Tx2-4-6+9 | Tx2-4-6+9 |
| 15 | Tx1+3-5-10 | Tx1-3+5-10 | Tx1-3-5+10 | Tx1-3-5+10 |
| 16 | Tx2+4-7-11 | Tx2-4+7-11 | Tx2-4-7+11 | Tx2-4-7+11 |

FIG. 6

| | $\alpha$ |
|---|---|
| $\rho > 0.9999$ | 4 |
| $0.9999 \geq \rho > 0.999$ | 2 |
| $0.999 \geq \rho$ | 1 |

WIRELESS APPARATUS AND TRAINING SIGNAL TRANSMISSION METHOD

CROSS-REFERENCE TO RELATED APPLICATIONS

This application is a 371 U.S. National Stage of International Application No. PCT/JP2013/051335, filed Jan. 23, 2013. Priority is claimed on Japanese Patent Application No. 2012-015917, filed Jan. 27, 2012. The entire contents of both applications are incorporated herein by reference.

TECHNICAL FIELD

The present invention relates to a wireless apparatus which estimates channel information between a plurality of transmission ports and receive antennas of communication partners in communication using an orthogonal frequency-division multiplexing scheme, and a training signal transmission method.

BACKGROUND ART

Recently, the spread of an Institute of Electrical and Electronics Engineers (IEEE) 802.11g standard, an IEEE 802.11a standard, and the like, as high-speed wireless access systems (wireless local area networks (LANs)) using a band of 2.4 GHz or a band of 5 GHz have been remarkable. In these systems, an orthogonal frequency-division multiplexing (OFDM) modulation scheme, which is technology for stabilizing the performance in a multipath fading environment, is used and a maximum transmission rate of 54 M bits per second (bps) in a physical layer is realized.

On the other hand, in wired LANs, the provision of a high-speed line of 100 Mbps, such as a 100 Base-T interface of the Ethernet (registered trademark), has spread due to the spread of fiber to the home (FTTH) which uses optical fibers in individual homes, and a further increase in a transmission rate is also required in the wireless LANs.

As technology therefor, multiple input multiple output (MIMO) technology has been introduced into IEEE 802.11n as spatial multiplexing transmission technology. Furthermore, in IEEE 802.11ac, a multiuser MIMO (MU-MIMO) communication method is being studied (e.g., see Non-Patent Document 1). The MU-MIMO communication has a potential to increase the throughput in the physical layer by a factor equal to the number of transmit antennas, but a transmitting apparatus requires channel information for stations in order to obtain a transmission diversity effect using many transmit antennas. However, there is a problem in that overhead is increased due to a signal for estimating the channel information and feedback information.

FIG. 10 is a sequence diagram describing an operation of acquiring channel information of OFDM communication in accordance with the conventional art. FIG. 10 illustrates an example in which an access point AP acquires channel information for K stations (STAs) STA-1 to STA-K. K is an integer which is greater than or equal to 1. In FIG. 10, reference sign 1 represents an announce signal (null data packet announce (NDPA)) indicating that a signal for channel estimation is transmitted, reference sign 2 represents a pilot signal for estimation (null data packet (NDP)), reference signs 3-1 to 3-K represent feedback signals (channel state information feedback (CSIFB)) of channel information, and reference signs 4-2 to 4-K represent polling signals (Polling) instructing a specific communication partner to transmit a response signal.

In addition, a breakdown of the pilot signal 2 is illustrated in the upper part of FIG. 10. The pilot signal 2 includes a first pilot symbol 2-1-1, a last pilot symbol 2-1-2, and N very high throughput-long training frames (VHT-LTFs) 2-2-1 to 2-2-N for enabling channel estimation corresponding to N transmit antennas. In order to acquire channel information for 8 transmit antennas, it is necessary to transmit the VHT-LTFs 2-2-1 to 2-2-N for 8 OFDM symbols. Here, a signal $S_k$ of a $k^{th}$ frequency channel of the VHT-LTFs 2-2-1 to 2-2-N can be determined as, for example, in Equations (19-11), (19-12), (19-23), and (19-24) disclosed in Non-Patent Document 2.

FIG. 11 is a block diagram illustrating a configuration of an access point (AP) 10 which acquires channel information of a wireless section of an OFDM signal in accordance with the conventional art. Reference sign 10-2 represents a long training frame generating circuit, reference sign 10-3 represents a wireless signal transmitting/receiving circuit, reference signs 10-4-1 to 10-4-N represent transmit/receive antennas, reference sign 10-5 represents a received signal demodulating circuit, reference sign 10-6 represents a feedback information extracting circuit, and reference sign 10-7 represents a channel information acquiring circuit.

When the access point (AP) 10 determines stations (STA) for which channel information is to be acquired, an announce signal (NDPA) 1 and a pilot signal (NDP) 2 in FIG. 10 are generated in the long training frame generation circuit 10-2, and conversion into analog signals, conversion into carrier frequencies, amplification, and so on are performed by the wireless signal transmitting/receiving circuit 10-3, and transmission is performed via the transmit/receive antennas 10-4-1 to 10-4-N.

When the channel information is transmitted from the stations STA-1 to STA-K by the feedback signals CSIFB 3-1 to 3-K of the channel information illustrated in FIG. 10, the access point (AP) 10 receives the signals via at least one of the transmit/receive antennas 10-4-1 to 10-4-N by using the wireless signal transmitting/receiving circuit 10-3 and outputs digital signals to the received signal demodulating circuit 10-5. The received signal demodulating circuit 10-5 establishes synchronization with the received signals, and obtains information acquired from any one of the stations STA-1 to STA-K by, for example, using channel information. The feedback information extracting circuit 10-6 extracts a feedback portion of the channel information by as feedback signal CSIFB of the channel information from the obtained demodulated bits, and the channel information acquiring circuit 10-7 acquires the channel information in each frequency channel.

Here, the fed-back channel information may be propagation channel information for a time domain, or it may be channel information in each frequency channel of OFDM, or information similar to the channel information, e.g., basis vectors obtained by applying a Gram-Schmidt orthogonalization method to the channel information, a right singular matrix of a channel information matrix, or the like can be used.

The feedback of the channel information may be compressed by representing a V matrix by angles $\phi$ and $\Psi$ or it may be obtained by acquiring part of information of frequency channels of OFDM (e.g., see Non-Patent Document 3). When the feedback information is compressed, the channel information acquiring circuit 10-7 estimates the original channel information by decompressing or interpolating the feedback information and stores the original channel information.

PRIOR ART DOCUMENTS

Non-Patent Documents

Non-Patent Document 1: IEEE, "Proposed specification framework for TGac," doc.: IEEE 802.11-09/0992r21, January 2011.
Non-Patent Document 2: IEEE, "IEEE P802.11 REVmb/D8.0," pp. 1597 and 1606, March 2011.
Non-Patent Document 3: IEEE, "IEEE P802.11n/D11.0," pp. 55 to 57, June 2009.

SUMMARY OF INVENTION

Problems to be Solved by the Invention

However, in an access point in which the number of transmit antennas is large, a large amount of channel information is necessary for each station serving as a communication partner. For example, when the number of antennas N of the access point (AP) 10 is large, there is a problem in that it is necessary to set the number of OFDM symbols (e.g., VHT-LTFs) for channel estimation to N or more and thus overhead is increased, and a problem in that the bit amount of feedback signals due to the feedback signals CSIFB of the channel information is large. These significantly deteriorate the system throughput in which layers up to a medium access control (MAC) layer are taken into consideration. In this way, because it is necessary to transmit OFDM symbols corresponding to the number of the antennas, overhead for channel estimation is increased as the number of the antennas is increased and the feedback information is also increased. Thus, there is a problem in that the length of a feedback information packet CSIFB from a station is also increased, which also becomes overhead. That is, because training signals corresponding to the number of transmission ports (transmit antennas or transmission beams) are necessary to accurately acquire channel information in the conventional MIMO transmission, there is a problem in that the number of training signals is also increased when the number of the antennas is increased and thus transmission efficiency is degraded.

The present invention has been made in consideration of such circumstances, and an object thereof is to provide a wireless apparatus and a training signal transmission method capable of reducing the number of OFDM symbols for channel estimation, reducing overhead due to a pilot signal and a feedback signal, and improving the throughput.

Means for Solving the Problems

In order to solve the above-described problems, the present invention is a wireless apparatus which estimates channel information between a plurality of transmission ports and receive antennas of a communication partner in communication based on an orthogonal frequency-division multiplexing scheme, and the wireless apparatus includes: an iterative coefficient setting unit which sets an iterative coefficient representing the number of transmission ports which share a plurality of frequency channels of training signals for estimating the channel information for the plurality of transmission ports; a training signal generating unit which allocates frequency channels to each transmission port so as to satisfy the iterative coefficient set by the iterative coefficient setting unit and generates L (L is a positive integer) training signals based on the allocated frequency channels; a wireless transmitting unit which outputs the training signals generated by the training signal generating unit to transmit antennas; a channel information acquiring unit which acquires channel information estimated from the training signals transmitted by the transmit antennas from the communication partner for the frequency channels allocated to each transmission port; and a channel information interpolating unit which interpolates channel information of a remaining frequency channel other than the frequency channels allocated to each transmission port among the plurality of frequency channels from the acquired channel information.

In addition, in the present invention, the iterative coefficient setting unit may set iterative coefficients as $\beta_1$ to $\beta_M$ for M (M is a positive integer) transmission ports and set the iterative coefficients $\beta_1$ to $\beta_M$ so that a sum of reciprocals of the iterative coefficients $\beta_1$ to $\beta_M$ becomes the integer L.

In addition, in the present invention, the training signal generating unit may allocate the frequency channels to each transmission port so as to satisfy the iterative coefficient, multiply signals corresponding to the same frequency channel of the L training signals by an L×L transform matrix, and allocate obtained L signals to the L training signals, and the wireless transmitting unit may output the training signals generated by the training signal generating unit to the transmit antennas.

In addition, in the present invention, the iterative coefficient setting unit may set, for each transmission port, an iterative coefficient set for a transmission port in which a vector corresponding to a signal space estimated using a set matrix of channel matrices for the receive antennas of the communication partner previously estimated serves as a transmission weight to a value less than an iterative coefficient corresponding to a null space which is orthogonal to the vector corresponding to the signal space.

In addition, the present invention is a training signal transmission method of a wireless apparatus which estimates channel information between a plurality of transmission ports and receive antennas of a communication partner in communication based on an orthogonal frequency-division multiplexing scheme, and the training signal transmission method includes: an iterative coefficient setting step of setting an iterative coefficient representing the number of transmission ports which share a plurality of frequency channels of training signals for estimating the channel information for the plurality of transmission ports; a training signal generating step of allocating frequency channels to each transmission port so as to satisfy the iterative coefficient set in the iterative coefficient setting step and generating L (L is a positive integer) training signals based on the allocated frequency channels; a wireless transmitting step of outputting the training signals generated in the training signal generating step to transmit antennas; a channel information acquiring step of acquiring channel information estimated from the training signals transmitted by the transmit antennas from the communication partner for the frequency channels allocated to each transmission port; and a channel information interpolating step of interpolating channel information of a remaining frequency channel other than the frequency channels allocated to each transmission port among the plurality of frequency channels from the channel information acquired in the channel information acquiring step.

Advantageous Effects of the Invention

In accordance with the present invention, there is an advantage in that the number of OFDM symbols for channel estimation can be set to be less than the number of antennas or the number of transmission beams for which channel information is to be estimated, overhead for the channel estimation can be reduced, and the throughput can be improved.

BRIEF DESCRIPTION OF DRAWINGS

FIG. 3 is a conceptual diagram illustrating a configuration of long training frames for channel estimation LTF (an example in which an independent value is set as β for each transmission port) in the first embodiment of the present invention.

FIG. 4 is a conceptual diagram illustrating a configuration of long training frames for channel estimation (part 1) in a second embodiment of the present invention.

FIG. 5 is a conceptual diagram illustrating a configuration of long training frames for channel estimation (part 2) in the second embodiment of the present invention.

FIG. 6 is a conceptual diagram illustrating a correspondence relationship between ranges of a correlation value ρ and fixed values α in the first and second embodiments of the present invention.

MODES FOR CARRYING OUT THE INVENTION

Hereinafter, embodiments of the present invention will be described with reference to the drawings.

A. First Embodiment

First, the first embodiment of the present invention will be described.

Figure 1:
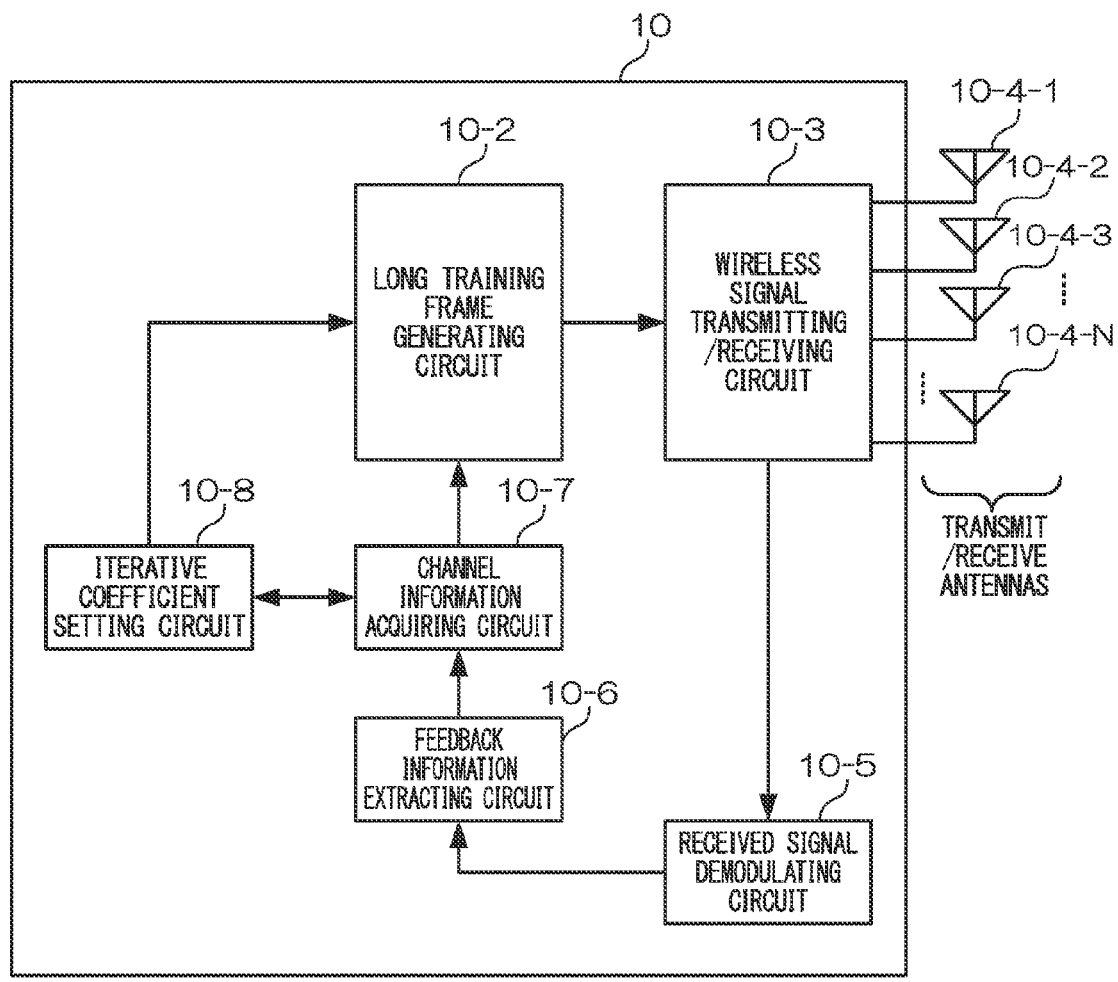
FIG. 1 is a block diagram illustrating a configuration of an access point (AP: wireless apparatus) 10 which acquires channel information of a wireless section of an OFDM signal in accordance with a first embodiment of the present invention.
Figure 11:
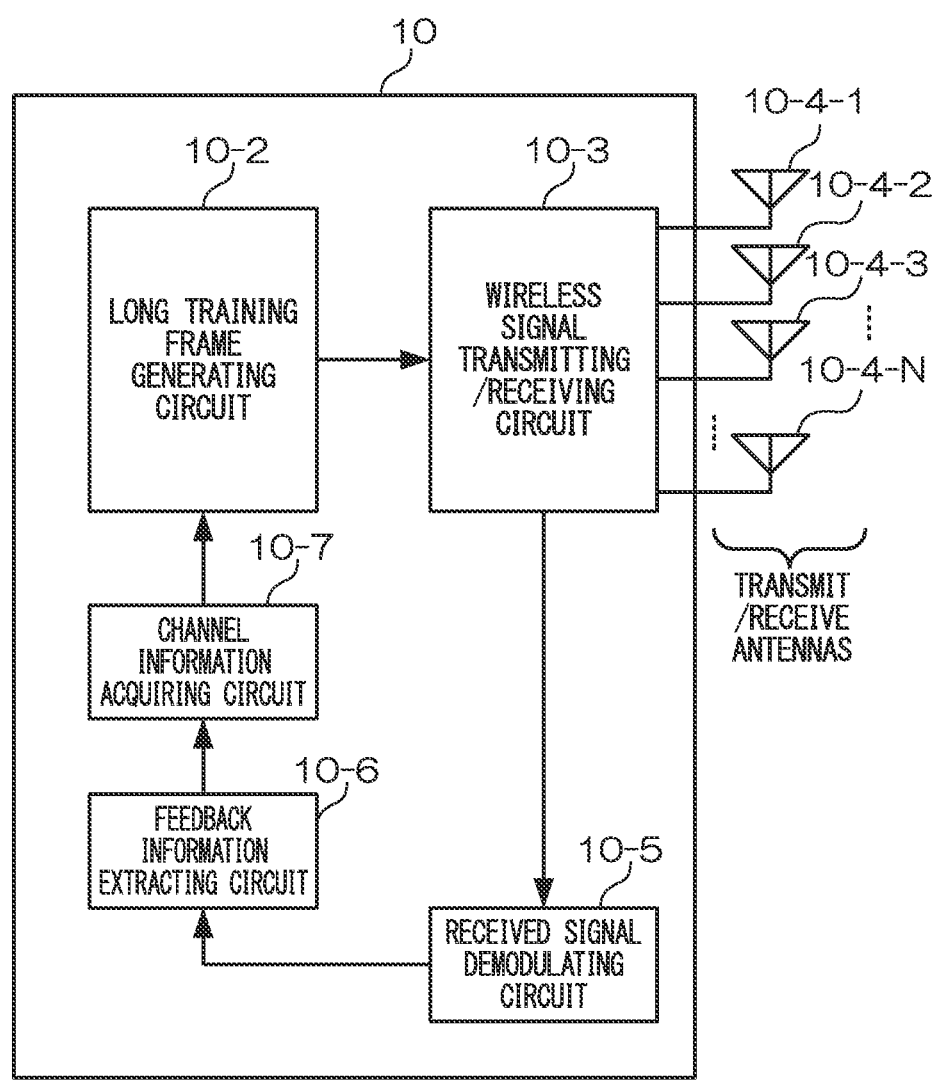
FIG. 11 is a block diagram illustrating a configuration of a wireless apparatus which performs transmission based on the multiuser MIMO in accordance with the conventional art.

FIG. 1 is a block diagram illustrating a configuration of an access point (AP: wireless apparatus) 10 which acquires channel information of a wireless section of an OFDM signal in accordance with the present first embodiment. The same reference signs are assigned to parts corresponding to those of FIG. 11 and a description thereof is omitted. In FIG. 1, an iterative coefficient setting circuit 10-8 determines an iterative coefficient for each transmit antenna or each transmission port which is a transmission beam, the number of long train-ing frames (LTFs) L which are OFDM symbols to be used for channel estimation, the correspondence between transmission ports and each LTF, and allocation of frequency channels.

The iterative coefficient is β which will be described later. When β=1, all subcarriers of one LTF are occupied by one transmission port. When β=2, the subcarriers of one LTF are shared by two transmission ports. When β=0.5, the subcarriers of two LTFs are occupied by one transmission port. In addition, a frequency channel corresponds to a subcarrier in OFDM transmission.

Figure 10:
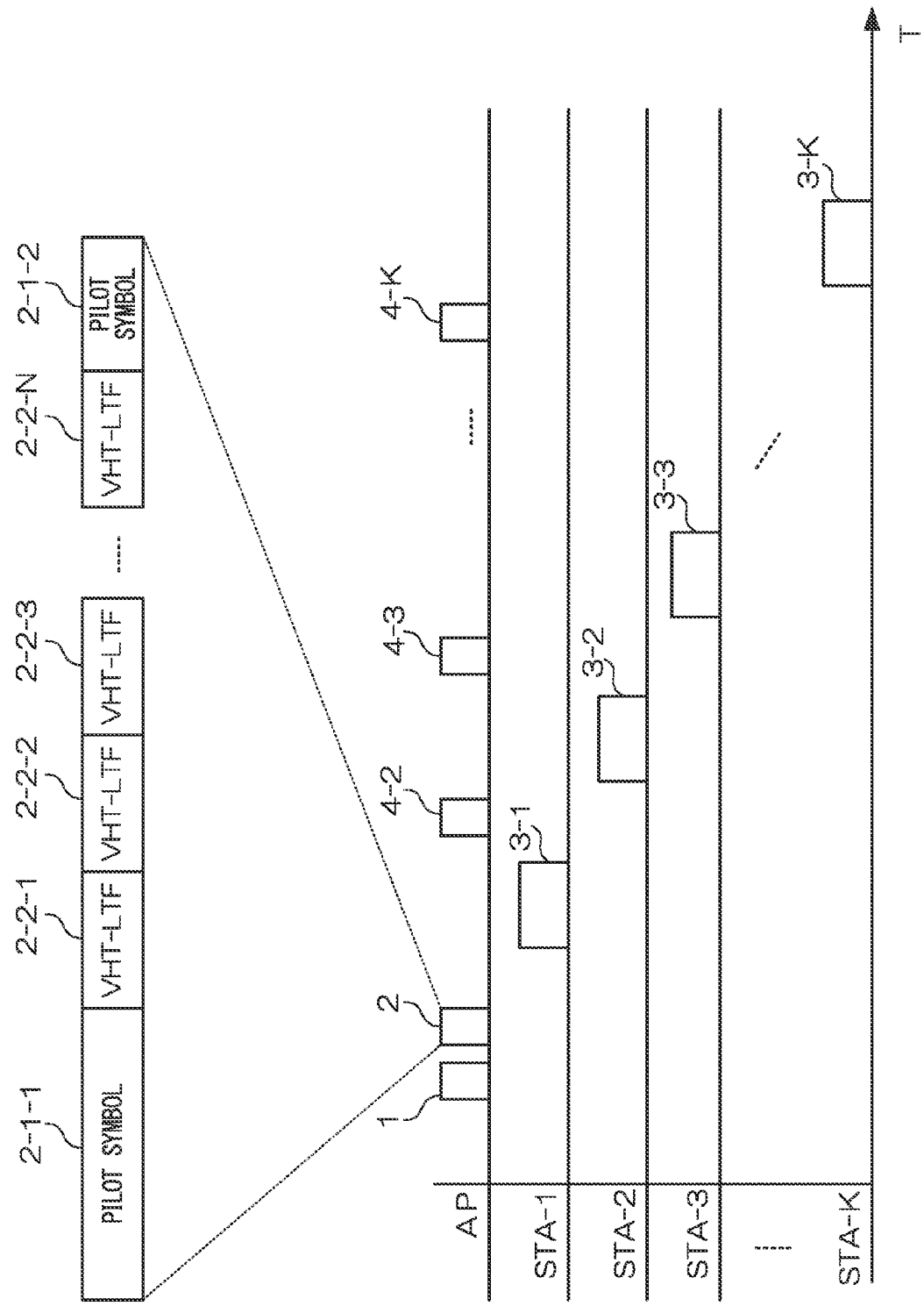
FIG. 10 is a frame sequence diagram illustrating an operation of multiuser MIMO communication in accordance with the conventional art.

In a pilot signal NDP illustrated in FIG. 10, all frequency channels are allocated to each transmit antenna and N VHT-LTFs 2-2-1 to 2-2-N are necessary to acquire channel information for all transmit antennas. That is, in the conventional art, one transmission port occupies all subcarriers of one LTF, and thus channel information is estimated using N LTFs when there are N transmission ports.

In contrast, in the scheme of the present embodiment, not all frequency channels are allocated to each transmission port and a channel to be estimated is limited, e.g., every two channels or every three channels. The number of frequency channels for which a signal for channel estimation of a transmission port of interest is inserted is represented as the iterative coefficient β, and iterative coefficients are determined as $β_1$ to $β_M$ for M transmission ports for which estimation is to be performed. Here, 1≤M≤N is established.

That is, the present embodiment is characterized in that, rather than each transmission port transmitting one training signal using all subcarriers of the training signal, an iterative coefficient is set and one training signal is shared by a plurality of transmission ports. Specifically, in the conventional art, the iterative coefficient β=1 and a training signal is transmitted using all subcarriers. In contrast, in the present embodiment, a plurality of transmission ports share one training signal (β>1), thereby reducing the necessary number of training signals and improving transmission efficiency.

In this way, there is channel information of a subcarrier to be omitted by sharing one training signal with other transmission ports, but it is possible to interpolate the channel information of the subcarrier to be omitted with a method using channel information estimated for an adjacent subcarrier or a method using an average of channel information estimated for a plurality of adjacent subcarriers.

Figures 2A, 2B:
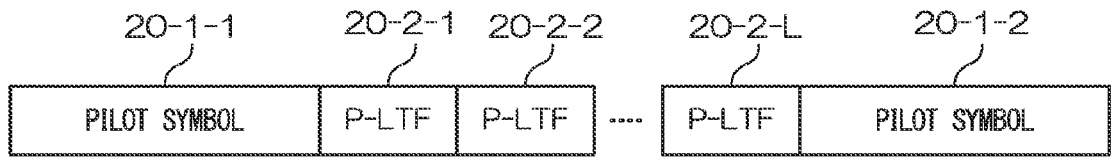
FIG. 2A is a conceptual diagram illustrating a configuration of a pilot signal NDP in the first embodiment of the present invention.
FIG. 2B is a conceptual diagram illustrating a configuration of long training frames for channel estimation in the first embodiment of the present invention.

FIGS. 2A and 2B are conceptual diagrams illustrating a configuration of a pilot signal NDP and a configuration of an LTF for channel estimation in the present first embodiment. In FIG. 2B, for simplicity, the number of frequency channels in which data or control signals is transmitted is assumed to be 16. However, as shown in Equations (19-11), (19-12), (19-23), and (19-24) of Non-Patent Document 2, it is possible to determine a configuration of the LTF for channel estimation similarly for the other numbers of frequency channels such as the number of frequency channels of 48, 52, 108, 234, and 468. Because β=2 in FIG. 2B, two transmission ports share one LTF. When N=8, L=4 is established, and thus there is an advantage in that the number of LTFs becomes half the number in the conventional art.

FIGS. 2A and 2B illustrates, when the access point (AP) 10 in which the number of transmit antennas is 8 transmits a pilot signal NDP for performing channel estimation in each station, pilot symbols 20-1-1 and 20-1-2 for channel estimation and long training frames P-LTFs (proposed LTFs) 20-2-1 to 20-2-L included therein. Here, it is assumed that the iterative coefficient setting circuit 10-8 estimates frequency channels for all (8) transmit antennas 10-4-1 to 10-4-8 (M=8) and the iterative coefficients satisfy $β_1=β_2= \ldots =β_8=2$. A long training frame generating circuit 10-2 allocates transmission ports to LTFs so as to satisfy the determined iterative coefficients. The number L of LTFs can be represented by the following Equation (1).

[Equation 1]

$$L = \left\lceil \sum_{i=1}^{M} \frac{1}{\beta_i} \right\rceil \quad (1)$$

In the above Equation (1), the bottomless square brackets represent a ceiling function, and A inserted between the bottomless square brackets is an integer obtained by rounding up the decimal places of A. Because it is possible to acquire channel information more efficiently if an arithmetic result of a sum within the function of right-side in Equation (1) is a positive integer L, the iterative coefficient setting circuit 10-8 can also set $\beta_1$ to $\beta_M$ so as to satisfy the following Equation (2).

[Equation 2]

$$\sum_{i=1}^{M} \frac{1}{\beta_i} = L \quad (2)$$

L is a positive integer also in the above Equation (2).

In FIG. 2B, Txi represents an $i^{th}$ transmission port, which indicates an $i^{th}$ transmit antenna or an $i^{th}$ transmission beam. Because the allocation coefficient of each transmission port is 2, channel information corresponding to 2 L transmission ports is obtained from L P-LTFs. Because channel information for one of two frequency channels is estimated, information of a frequency channel that is not estimated can be interpolated using channel information obtained for frequency channels of near frequencies. Because channel information in each frequency channel has a high correlation with channel information of adjacent frequency channels, it is possible to use interpolation, extrapolation, or the like using the correlation. When a larger value is set as β, the number of P-LTFs to be transmitted can be further reduced and a feedback amount of the channel information can also be further reduced.

FIG. 3 is a conceptual diagram illustrating a configuration of long training frames for channel estimation (an example in which an independent value is set asp for each transmission port) in the present first embodiment. FIG. 3 is an example in which $\beta_1=\beta_2=\beta_3=\beta_4=\beta_5=2$ and $\beta_6=\beta_7=\beta_8=\beta_9=\beta_{10}=\beta_{11}=4$. $1/\beta_1+1/\beta_2 1/\beta_3+1/\beta_4+1/\beta_5+1/\beta_6+1/\beta_7+1/\beta_8+1/\beta_9+1/\beta_{10}+1/\beta_{11}=4$ is established, and the number of P-LTFs is 4. In addition, because a sum of reciprocals of the iterative coefficients is a positive integer, all frequency channels are used as channel estimation signals.

FIG. 3 illustrates an example in which the value of β differs depending on each transmission port. Describing in sequence, transmission ports #1 and #2 share one P-LTF 20-2-1, transmission ports #3 and #4 share one P-LTF 20-2-2, transmission ports #5, #6, and #7 share one P-LTF 20-2-3, and transmission ports #8, #9, #10, and #11 share one P-LTF 20-2-4. In this case, there is an advantage in that the necessary number of LTFs which is 11 conventionally can be reduced to 4.

Here, it is possible to acquire more accurate channel information when $\beta_j$ is smaller. For example, $\beta_j$ can be set to be smaller when a transmission port has a higher signal power level in a communication partner in previous communication or, in contrast, $\beta_j$ can be set to be smaller when a transmission port has a lower signal power level.

B. Second Embodiment

Next, the second embodiment of the present invention will be described.

It is to be noted that because the configuration of an access point (AP: wireless apparatus) 10 is similar to that of FIG. 1, a description thereof is omitted. The present second embodiment will describe a form in which transmission from a plurality of transmit antennas or transmission beams is performed in a given frequency channel and a P-LTF of given timing using a transform matrix D. The iterative coefficient setting circuit 10-8 can also set an iterative coefficient in each transmission port, and the long training frame generating circuit 10-2 can transform transmission signals of transmission ports allocated to obtained L P-LTFs using the transform matrix D after allocating the transmission ports to the frequency channels and newly allocate the transmission ports to the L P-LTFs.

In the present second embodiment, a description will be given in which the long training frames initially allocated as in the first embodiment are defined as virtual P-LTFs (VP-LTFs) and transmission ports are allocated to the P-LTFs after a transform using the transform matrix D. First, an L×L matrix D is defined as in the following Equation (3).

[Equation 3]

$$D = \begin{pmatrix} d_{11} & d_{21} & \cdots & d_{L1} \\ d_{12} & d_{22} & \cdots & d_{L2} \\ \vdots & \vdots & \ddots & \vdots \\ d_{1L} & d_{2L} & \cdots & d_{LL} \end{pmatrix} \quad (3)$$

Assuming that numbers of transmission ports allocated to a $k^{th}$ frequency channel are $t_{k,1}, t_{k,2}, \ldots, t_{k,L}$, and a signal in the $k^{th}$ frequency channel transmitted from the transmission port $t_{k,g}$ is $S_k(t_{k,g})$, a transmission signal $X_{k,j}$ of the $j^{th}$ P-LTF is represented by the following Equation (4).

[Equation 4]

$$X_{k,j} = (d_{j1} \quad d_{j2} \quad \cdots \quad d_{jL}) \begin{pmatrix} S_k(t_{k,1}) \\ S_k(t_{k,2}) \\ \vdots \\ S_k(t_{k,L}) \end{pmatrix} \quad (4)$$

$$= d_{j1}S_k(t_{k,1}) + d_{j2}S_k(t_{k,2}) + \ldots + d_{jL}S_k(t_{k,L})$$

Here, the signal of the corresponding frequency channels of Equations (19-11), (19-12), (19-23), and (19-24) of Non-Patent Document 2 can be used as $S_k(t_{k,g})$. First to $L^{th}$ transmission signals $X_{k,1}$ to $X_{k,L}$ are represented by the following Equation (5).

[Equation 5]

$$\begin{pmatrix} X_{k,1} \\ X_{k,2} \\ \vdots \\ X_{k,L} \end{pmatrix} = D^T \begin{pmatrix} S_k(t_{k,1}) \\ S_k(t_{k,2}) \\ \vdots \\ S_k(t_{k,L}) \end{pmatrix} \quad (5)$$

It is possible to use an orthogonal matrix which satisfies, for example, $D^H D = I$ as the transform matrix D. Here, I is a diagonal matrix in which non-diagonal terms are 0 and diagonal terms are 1.

FIG. 4 is a conceptual diagram illustrating a configuration of long training frames for channel estimation (part 1) in the present second embodiment. FIG. 4 is an example in which the number M of transmit antennas for which channel estimation is performed is 8, $\beta_1$ to $\beta_8$ are 2, and the number of P-LTFs L is 4. That is, an example in which $\beta_1$ to $\beta_8$ are determined for transmission ports #1 to #8, the transmission ports are allocated to VP-LTFs 21-2-1 to 21-2-4, and then P-LTFs 20-2-1 to 20-2-4 are generated using the transform matrix D is illustrated. In the present second embodiment, as in the first embodiment, one of $\beta_i$ frequency channels is allocated to an $i^{th}$ transmission port. This allocation can be regarded as allocation to the L VP-LTFs 21-2-1 to 21-2-L. Transmission ports #1, #3, #5, and #7 are allocated to the first frequency channel ch1 of FIG. 4 ($t_{1,1}=1$, $t_{1,2}=3$, $t_{1,3}=5$, and $t_{1,4}=7$). Because L=4, it is possible to use a 4×4 matrix as the transform matrix. Here, assuming that an Hadamard matrix is used as D, the following Equation (6) can be used.

[Equation 6]

$$D = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (6)$$

Consequently, in the first frequency channel ch1, transmission signals in the first to $L^{th}$ P-LTFs 20-2-1 to 20-2-L become signals represented by $S_1(1)+S_1(3)+S_1(5)+S_1(7)$, $S_1(1)-S_1(3)+S_1(5)-S_1(7)$, $S_1(1)+S_1(3)-S_1(5)-S_1(7)$, and $S_1(1)-S_1(3)-S_1(5)+S_1(7)$, respectively. It is possible to generate P-LTF signals by obtaining transmission signals in each frequency channel, generating OFDM symbols using a Fourier transform, and performing addition of guard intervals. Even when the PTFs are generated by mixing signals in this manner, a communication partner can obtain the original channel information of the transmission port by performing a transform using the same Hadamard matrix.

FIG. 5 is a conceptual diagram illustrating a configuration of long training frames for channel estimation (part 2) in the present second embodiment. FIG. 5 illustrates an example in which $\beta_1$ to $\beta_{11}$ are determined for transmission ports #1 to #11 as in FIG. 3, the transmission ports are allocated to the VP-LTFs 21-2-1 to 21-2-4, and then P-LTFs 20-2-1 to 20-2-4 are generated using the transform matrix D. Here, $\beta_1=\beta_2=\beta_3=\beta_4=\beta_5=2$, $\beta_6=\beta_7=\beta_8=\beta_9=\beta_{10}=\beta_{11}=4$, M=11, and L=4. In this manner, it is possible to generate the P-LTFs for arbitrary $\beta$ even when the transform matrix D is used. For example, transmission ports #1, #3, #5, and #8 are allocated to the fifth frequency channel ch5 ($t_{5,1}=1$, $t_{5,2}=3$, $t_{5,3}=5$, and $t_{5,4}=8$).

When the Hadamard matrix of Equation (6) is used, transmission signals of the first to $L^{th}$ P-LTFs in the fifth frequency channel ch5 become $S_1(1)+S_1(3)+S_1(5)+S_1(8)$, $S_1(1)-S_1(3)+S_1(5)-S_1(8)$, $S_1(1)+S_1(3)-S_1(5)-S_1(8)$, and $S_1(1)-S_1(3)-S_1(5)+S_1(8)$, respectively. It is possible to generate the P-LTFs signal by obtaining transmission signals in each frequency channel, generating OFDM symbols using a Fourier transform, and performing addition of guard intervals.

Next, a method for determining $\beta_j$ in the above-described first and second embodiments will be described. When $\beta_1$ to $\beta_M$ are set to a fixed value $\alpha$, it is possible to use a correlation value $\rho$ of channel information and a channel power value P in previously acquired channel information. When channels between M transmission ports in the $k^{th}$ frequency channel and a given receive antenna of a communication partner are represented by an M×1 channel vector $h_k$, the correlation value $\rho$ can be represented by, for example, the following Equation (7). $E(\bullet)$ is a function representing an expected value and $|\bullet|$ represents an absolute value.

[Equation 7]

$$\rho = E\left( \frac{|h_k^H h_{k+1}|}{\sqrt{|h_k^H h_k||h_{k+1}^H h_{k+1}|}} \right) \quad (7)$$

FIG. 6 is a conceptual diagram illustrating a correspondence relationship between ranges of the correlation value $\rho$ and fixed values $\alpha$ in the above-described first and second embodiments. As illustrated in FIG. 6, the fixed value $\alpha$ can be selected in accordance with the range of $\rho$. Likewise, it is also possible to determine $\alpha$ using a channel power value or previous communication quality as an index.

Alternatively, it is possible to execute control using $\beta_i$ as collection of information for selection of transmit antennas or selection of transmission beams. When communication is being performed using J transmit antennas or transmission beams, wherein J is less than the number N of transmit antennas, if the number of transmission beams or transmit antennas to be newly used is increased, Q transmission ports can be selected as transmission ports for which channel estimation is newly performed from among the remaining transmit antennas or transmission beams (M=J+Q and 1≤Q≤(N−J)).

Here, by predetermining the number of P-LTFs to be used in estimation of channel information of Q new transmission ports to be newly added as $\gamma$, it is possible to set iterative coefficients for the Q transmission ports to be newly added to $\beta_{J+1}=\beta_{J+2}=\ldots=\beta_{J+Q}=$ceil (Q/$\gamma$) (ceil (Q/$\gamma$) is an integer obtained by rounding up the decimal places of Q/$\gamma$). For example, when a wireless apparatus of N=16 is performing communication using 8 antennas, the channel information of the remaining transmission ports is acquired using one P-LTF ($\gamma=1$). When L=8 and channel information for 8 transmission ports is estimated so far, it is possible to collectively acquire channel information for the remaining 8 transmission ports by updating L to 9 and setting $\beta_1=\beta_2=\ldots=\beta_8=1$ and $\beta_9=\beta_{10}=\ldots=\beta_{16}=8$. In addition, it is possible to acquire channel information for the remaining large number of antennas by simply newly adding a small number ($\gamma$) of long training frames.

Next, an example of a method for setting iterative coefficients in channel estimation using transmission beams will be described. When the transmission beams are used, it is possible to calculate and store transmission weights for each frequency channel from previously estimated channel information. For example, it is assumed that there are K communication partners having $N_{r,1}$ to $N_{r,K}$ receive antennas and the maximum spatial multiplexing orders to be used for these communication partners are $B_1$ to $B_K$. Because it is not possible to use a spatial multiplexing order that is greater than the number of antennas, $1 \leq B_i \leq \text{Min}(N, N_{r,i})$ ($1 \leq i \leq K$) is established. Min (A, B) is a function representing a smaller number between A and B. At this time, channel information with an $i^{th}$ communication partner in a $k^{th}$ frequency channel can be represented by the following Equation (8) as an $N_{r,i} \times N$ channel matrix $H_{k,i}$.

[Equation 8]

$$H_{k,i} = \begin{pmatrix} H_{k,i,11} & H_{k,i,12} & \cdots & H_{k,i,1N} \\ H_{k,i,21} & H_{k,i,22} & \cdots & H_{k,i,2N} \\ \vdots & \vdots & \ddots & \vdots \\ H_{k,i,N_{r,i}1} & H_{k,i,N_{r,i}2} & \cdots & H_{k,i,N_{r,i}N} \end{pmatrix} \quad (8)$$

Here, $H_{k,i,xy}$ represents a channel coefficient between a $y^{th}$ transmission port and an $x^{th}$ receive antenna. Here, channel information between receive antennas and transmission ports is used, but channel information for received beams formed by the communication partner in a $k^{th}$ frequency channel may be used. In order to distinguish from an actual channel, channel information for an $i^{th}$ communication partner of the $k^{th}$ frequency channel acquired by the wireless apparatus in a previous channel estimation sequence is represented by the following Equation (9).

[Equation 9]

$$G_{k,i} = \begin{pmatrix} G_{k,i,11} & G_{k,i,12} & \cdots & G_{k,i,1N} \\ G_{k,i,21} & G_{k,i,22} & \cdots & G_{k,i,2N} \\ \vdots & \vdots & \ddots & \vdots \\ G_{k,i,N_{r,i}1} & G_{k,i,N_{r,i}2} & \cdots & G_{k,i,N_{r,i}N} \end{pmatrix} \quad (9)$$

Assuming that there is no channel estimation error, $H_{k,i}=G_{k,i}$ is established.

First, the case of $(N_{r,1}+N_{r,2}+\ldots+N_{r,K})<N$ is considered. In this case, transmission weights can be calculated from, for example, these estimated channel matrices $G_{k,i}$. A set channel matrix for stations serving as communication partner is defined by the following Equation (10).

[Equation 10]

$$G_k = \begin{pmatrix} G_{k,1} \\ G_{k,2} \\ \vdots \\ G_{k,K} \end{pmatrix} \quad (10)$$

Here, it is not necessary for $G_k$ to be perfect. For example, if channel information for only M transmission ports is acquired in previous communication, Equation (10) can be given by randomly setting a coefficient for a transmit antenna for which estimation is not performed or setting the coefficient to 0. Basis vectors obtained using a Gram-Schmidt orthogonalization method for column vectors of a complex conjugate transpose matrix of $G_k$ can be used as transmission weights for transmission ports. Similarly, when $(N_{r,1}+N_{r,2}+\ldots+N_{r,K})<N$, column vectors of a unitary matrix $E_k$ obtained by representing $G_k$ by QR decomposition as the following Equation (11) can be used as transmission weights.

[Equation 11]

$$G_k^H = E_k R_k \quad (11)$$

Here, $R_k$ is an upper triangular matrix, and $E_k$ is an $N \times (N_{r,1}+N_{r,2}+\ldots+N_{r,K})$ matrix. Alternatively, a right singular vector $V_k^{(1)}$ corresponding to singular values obtained by singular value decomposition as the following Equation (12) can also be set as transmission weights for transmission ports.

[Equation 12]

$$G_k = U_k(\Sigma_k 0)(V_k^{(1)} V_k^{(0)})^H \quad (12)$$

Here, $U_k$ is a left singular vector, $\Sigma_k$ is a singular value matrix which is a diagonal matrix in which diagonal elements are singular values, and $V_k^{(0)}$ is a right singular vector corresponding to a zero matrix. $V_k^{(1)}$ is an $N \times (N_{r,1}+N_{r,2}+\ldots+N_{r,K})$ matrix.

It is possible to form transmission beams by performing multiplication on output signals to the transmission ports using $(N_{r,1}+N_{r,2}+\ldots+N_{r,K})$ $N \times 1$ vectors obtained in this manner as a transmission weight $W_{k,0}$, and to estimate channel information. Here, it is possible to perfectly estimate a set matrix $H_k$ by using $W_{k,0}$ obtained in this manner as long as $G_k$ used when $W_{k,0}$ is calculated is the same as $H_k$ (there is no estimation error and $G_k = H_k$). That is, when each column vector of $W_{k,0}$ is a vector of which absolute value is 1, the following Equation (13) is established and there is no loss of signal power even when $W_{k,0}$ is used.

[Equation 13]

$$\|W_{k,0} H_k\|_F^2 = \|H_k\|_F^2 \quad (13)$$

Here, $\|\bullet\|_F$ represents a Frobenius norm.

Even if an LTF which uses, as the transmission weight, a transmission weight $W_{k,N}$ that satisfies $W_{k,0}^H W_{k,N} = 0$ and that is orthogonal to the transmission weight $W_{k,0}$ is newly added, the LTF does not contribute to channel estimation because the following Equation (14) is established and there is no merit to add the LTF.

[Equation 14]

$$\|W_{k,N} H_k\|_F^2 = 0 \quad (14)$$

However, the following Equations (15) and (16) are established when $G_k \neq H_k$.

[Equation 15]

$$\|W_{k,0} H_k\|_F^2 < \|H_k\|_F^2 \quad (15)$$

[Equation 16]

$$\|W_{k,N} H_k\|_F^2 = \Gamma_k \quad (16)$$

Here, $\Gamma_k$ represents signal power when the transmission weight $W_{k,N}$ is used.

When a transmission weight $W_{k,0}$ for channel estimation that is optimum for the wireless apparatus is used, a deviation from an actual propagation environment occurs and N transmission beams equal in number to the number of transmit antennas must be prepared in order to estimate channel information for all transmission ports. However, because a power value of channel information obtained using the transmission weight $W_{k,N}$, which is orthogonal to the transmission weight $W_{k,0}$, is significantly less than a power value obtained using the transmission weight $W_{k,0}$, it is possible to set an iterative coefficient β to a larger value for a transmission beam corresponding to the transmission weight $W_{k,N}$.

For example, it is assumed that there are three communication partners (K=3) each having two receive antennas ($N_{r,1}=N_{r,2}=N_{r,3}=2$). An example in which the number of transmit antennas is 30 is considered. In this case, a 30×6 matrix $E_k$ is obtained from Equation (10) in each frequency channel, and six transmission beams are obtained. When transmission beams in which all transmission weights are orthogonal to each other are prepared, transmission beams for the remaining 24 null spaces can be generated.

In the embodiment of the present invention, iterative coefficients for transmission beams corresponding to signal spaces obtained by Equation (11) or (12) are set to be small and iterative coefficients for the other transmission beams are set to be larger than them. The iterative coefficients for the transmission beams corresponding to the signal spaces may be determined based on a correlation between frequency channels, power of a channel with a communication partner, and/or previous communication quality. The highest estimation accuracy is obtained by setting β to 1.

In contrast, β of the transmission beams for the null spaces are set to be larger than this. Assuming that the number of transmission beams for the signal spaces is $N_s$, the number of transmission beams for the null spaces becomes $N-N_s$. By setting $β=N-N_s$, it is possible to estimate channels of all the remaining transmission beams using one long training frame. However, when $N-N_s$ is larger than the number of frequency channels F, F transmission beams may be selected from among $N-N_s$ transmission beams or a plurality of long training frames may be used for the transmission beams for the null spaces.

In addition, if there are channel estimation results for the same transmission beam in two or more frequency channels, it is possible to estimate all frequency channels by performing interpolation or extrapolation from these estimated channels. Consequently, when the minimum number of transmission ports that are present in the same training frame is defined as $F_0$ ($F_0≥2$), it is possible to set an iterative coefficient β set for the transmission beams for the null spaces to a value less than or equal to $F/F_0$.

Figure 7:
FIG. 7 is a conceptual diagram illustrating a configuration of long training frames for channel estimation (part 3) in the second embodiment of the present invention.

FIG. 7 is a conceptual diagram illustrating a configuration of long training frames for channel estimation (part 3) in the present second embodiment. FIG. 7 is an example in which setting of $β_1=β_2=β_3=β_4=β_5=β_6=2$ is performed for six transmission beams Tx1 to Tx6 corresponding to signal spaces, setting of $β_7=β_8=\ldots=β_{22}=16$ is performed for the other 16 transmission beams Tx7 to Tx22, and P-LTFs 20-2-1 to 20-2-4 are generated from VP-LTFs 21-2-1 to 21-2-4 using a transform matrix D in accordance with the second embodiment. By performing control in this manner, it is possible to estimate channels without increasing the number of P-LTFs even when the number of transmit antennas is significantly increased.

In addition, because it is necessary for the embodiments of the present invention to obtain channel information through interpolation/extrapolation in a frequency domain when channel information is to be estimated for a null signal, a channel estimation result in a frequency channel other than frequency channels through which transmission is performed using the transmission weights has low accuracy. Thus, the channel estimation result by transmission beams for the null signal may not be used in the calculation of transmission weights to be calculated for data transmission and it may be taken into consideration for only $W_{k,0}$ to be calculated in the next channel estimation. In addition, in the channel estimation for the null signal, a receiving station may not receive a value of sufficiently larger than noise. In this case, because the reliability of the channel estimation result is low, feedback information may not be fed back from a reception end or channel information having a low reception level may not be used as information for calculation of transmission weights.

Although the transmission weights for the transmission ports have been described above, how transmission weights for transmission ports are represented as transmission weights for transmit antennas will be described. The channel matrix represented by Equations (8) or (9) is considered to correspond to channel information between the transmit antennas and receive antennas. The transmission weight $W_k$ used for channel estimation selected from the transmission weight $W_{k,0}$ for the signal spaces and the transmission weight $W_{k,N}$ for the null spaces can be calculated from the obtained channel matrix. Next, Φ transmission beams formed by the transmission weight $W_k$ are set as transmission ports and channel estimation is performed. Here, the transmission weight $W_k$ is an N×Φ matrix. It is assumed that when a training frame is transmitted from the Φ transmission beams and α>1, channel information in a frequency channel in which transmission using the transmission weight and estimation are not actually performed is extrapolated or interpolated. Channel information of a $k^{th}$ frequency estimated by an $i^{th}$ communication partner is represented by the following Equation (17).

[Equation 17]

$$G'_{k,i}=H_{k,i}W_k N_{k,i} \qquad (17)$$

Here, $N_{k,i}$ represents a noise matrix having noise components as diagonal terms.

$G'_{k,i}$ is a channel matrix between each transmission beam and an $i^{th}$ receive antenna, and it is an $N_{r,i}×Φ$ matrix. After $G'_{k,i}$ has been converted into bit information, the bit information is fed back to the wireless apparatus. A set channel matrix $G'_k$ is obtained as the following Equation (18).

[Equation 18]

$$G'_k = \begin{pmatrix} G'_{k,1} \\ G'_{k,2} \\ \vdots \\ G'_{k,K} \end{pmatrix} \qquad (18)$$

By substituting $G'_k$ of an $(N_{r,1}+N_{r,2}+\ldots+N_{r,K})×Φ$ matrix as $G_k$ into Equation (11) or (12), it is possible to newly obtain a basis vector $E_k$ for the signal spaces or $V_k^{(1)}$ as a transmission weight $W'_{k,0}$ for the signal spaces. It is to be noted that the transmission weight $W'_{k,0}$ for these signal spaces is a Φ×$(N_{r,1}+N_{r,2}+\ldots+N_{r,K})$ matrix and Φ≤N is established. Here, because the estimated $G'_k$ is a channel matrix in which transmission beams serves as transmission ports, a transmission weight $W_{k,0}^{(2)}$ for the signal spaces for each transmit antenna can be represented as the following Equation (19).

[Equation 19]

$$W_{k,0}^{(2)}=W_{k,0}W'_{k,0} \qquad (19)$$

When $W_{k,0}^{(2)}$ is used as a transmission weight for the next channel estimation by, for example, newly adding transmission beams corresponding to the null spaces thereto, the transmission weight $W'_{k,0}$ for the signal spaces is calculated using $G'_k$ obtained by further feedback, and a transmission weight $W_{k,0}^{(3)}$ for the signal spaces for the transmit antennas is calculated by the following Equation (20).

[Equation 20]

$$W_{k,0}^{(3)} = W_{k,0}^{(2)} W'_{k,0} \quad (20)$$

In this manner, when transmission weights are calculated using a channel matrix between transmission beams and reception ports in Equation (8) or (9), it is necessary to multiply original transmission weights for transmission beams by newly calculated transmission weights when transmission weights for the transmission beams are converted into transmission weights for the transmit antennas. In this manner, it is possible to acquire channel information corresponding to many antennas using LTFs in a number less than the number of antennas while updating the transmission weights for channel estimation.

Figure 8:
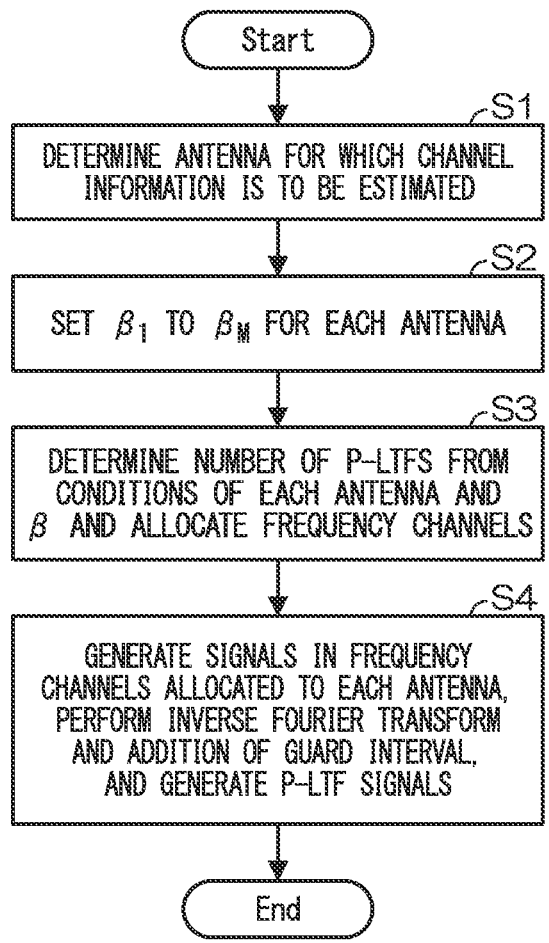
FIG. 8 is a flowchart describing an operation of acquiring channel information between transmit antennas and communication partners in the first and second embodiments of the present invention.

FIG. 8 is a flowchart describing an operation of acquiring channel information between transmit antennas and communication partners in the first and second embodiments of the present invention. When acquisition of the channel information starts, the iterative coefficient determining circuit 10-8 determines antennas for which the channel information is to be acquired (step S1) and determines iterative coefficients $\beta_1$ to $\beta_M$ for the antennas (step S2). Next, the long training frame generating circuit 10-2 determines the number of P-LTFs so as to satisfy the iterative coefficients $\beta_1$ to $\beta_M$ of the antennas and allocates frequency channels (step S3), generates signals corresponding to frequency channels generated in each P-LTF for each transmit antenna, performs an inverse Fourier transform, adds a guard interval, and generates L P-LTF signals (step S4).

It is to be noted that in the above-described step S4, it is also possible to distribute a signal of a given frequency channel to L P-LTFs 20-2-1 to 20-2-L using the transform matrix D.

Viewed from each antenna, there is no signal in a frequency channel other than the allocated frequency channels, and thus a peak to average power ratio (PAPR) in an OFDM signal becomes small. Using this feature, it is also possible to increase the amplitude of a long training frame using part of a reduced amount of the PAPR.

Figure 9:
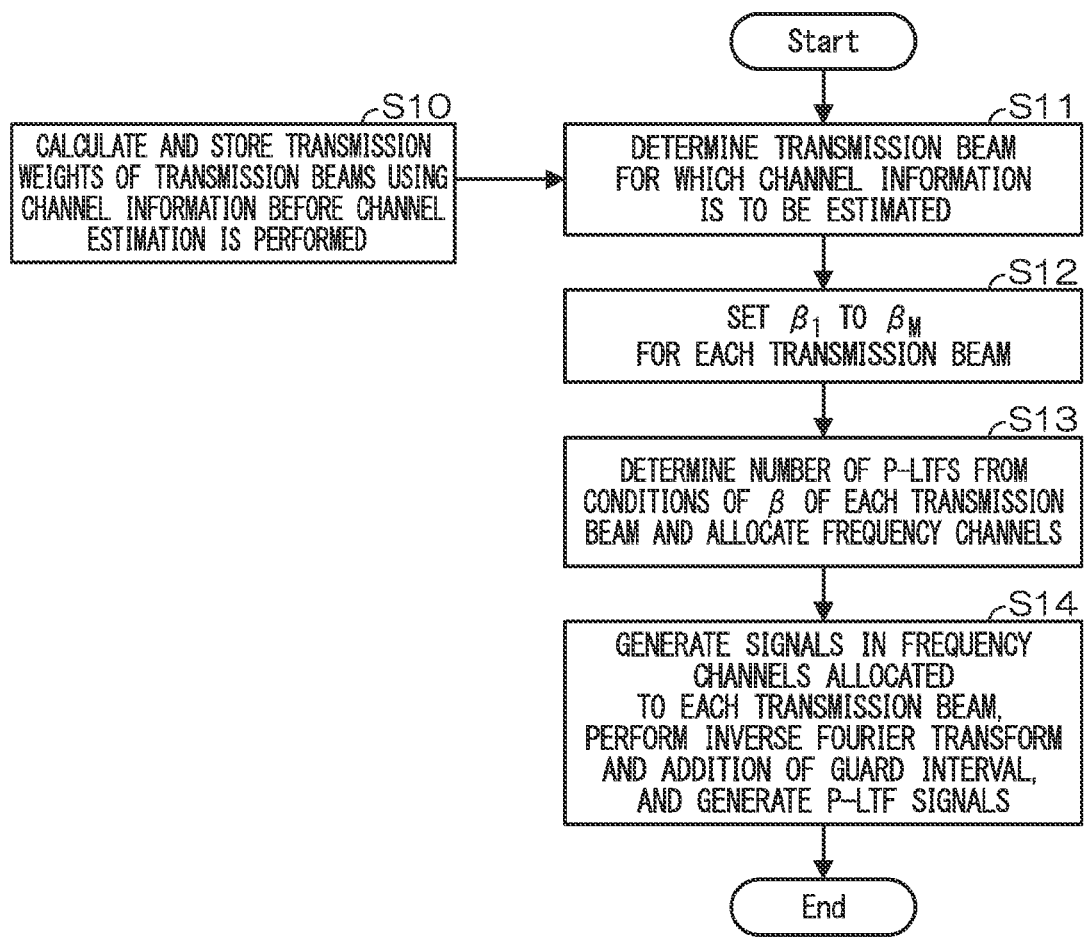
FIG. 9 is a flowchart describing an operation of acquiring channel information between transmission beams and communication partners in the first and second embodiments of the present invention.

FIG. 9 is a flowchart describing an operation of acquiring channel information between transmission beams and communication partners in the first and second embodiments of the present invention. Before channel estimation is performed, transmission weights for transmission beams are determined and stored using channel information obtained from previous communication (step S10). When there is no channel information acquired in the previous communication in step S10, it is also possible to randomly determine the transmission weights, store fixed transmission weights in advance, or use transmission weights calculated from channel information when signals from the communication partners is acquired.

When acquisition of the channel information starts, the iterative coefficient determining circuit 10-8 determines transmission beams for which the channel information is to be estimated (step S11) and sets iterative coefficients $\beta_1$ to $\beta_M$ for the transmission beams (step S12). Next, the long training frame generating circuit 10-2 determines the number of P-LTFs so as to satisfy the iterative coefficients $\beta_1$ to $\beta_M$ of the transmission beams and allocates transmission ports to frequency channels (step S13). Next, the long training frame generating circuit 10-2 generates signals corresponding to frequency channels generated in each P-LTF for the transmission beams, performs an inverse Fourier transform, adds a guard interval, and generates L P-LTF signals (step S14).

It is to be noted that in the above-described step S14, it is also possible to distribute a signal of a given frequency channel to L P-LTFs 20-2-1 to 20-2-L using the transform matrix D.

In accordance with the above-described first and second embodiments, it is possible to reduce the number of OFDM symbols for channel estimation, reduce overhead due to a pilot signal and a feedback signal, and improve the throughput by including channel estimation signals for a plurality of antennas or transmission beams in one OFDM symbol when the number of antennas is large in a wireless apparatus of an OFDM system.

It is to be noted that in the above-described first and second embodiments, a wireless communication process may be performed by recording a program for realizing the function of each processing unit illustrated in FIG. 1 on a computer-readable recording medium and causing a computer system to read and execute the program recorded on the recording medium. It is to be noted that the "computer system" referred to here is assumed to include an operating system (OS) and hardware such as peripheral devices. In addition, the "computer-readable recording medium" refers to a storage apparatus including a portable medium such as a flexible disk, a magneto-optical disc, a read only memory (ROM), and a compact disc (CD)-ROM as well as a hard disk or the like embedded in the computer system. Furthermore, the "computer-readable recording medium" is assumed to include a medium that holds a program for a given period of time, such as a volatile memory (e.g., a random access memory (RAM)) inside a computer system serving as a server or a client when the program is transmitted via a network such as the Internet or a communication circuit such as a telephone circuit.

In addition, the above program may be transmitted from a computer system storing the program in a storage apparatus or the like to another computer system via a transmission medium or by transmission waves in the transmission medium. Here, the "transmission medium" via which the program is transmitted refers to a medium having a function of transmitting information, such as a network (communication network) like the Internet or a communication circuit (communication line) like a telephone circuit. In addition, the above program may be a program which realizes part of the above-described functions. Furthermore, the above program may be a program capable of realizing the above-described functions in combination with a program already recorded on the computer system, i.e., a so-called differential file (differential program).

While the embodiments of the present invention have been described above with reference to the drawings, it is apparent that the above embodiments are illustrations of the present invention and the present invention is not to be limited to the above embodiments. Therefore, additions, omissions, substitutions, and other modifications of structural elements can be made without departing from the spirit or scope of the present invention.

As described above, the embodiments of the present invention realize a communication system which reduces the number of OFDM symbols for channel estimation and increases the throughput as a result of improvement in the MAC efficiency by allocating a plurality of transmit antennas or transmission beams to each OFDM symbol for channel information.

INDUSTRIAL APPLICABILITY

The present invention is applicable to, for example, communication based on an orthogonal frequency-division multiplexing scheme. In accordance with the present invention, the number of OFDM symbols for channel estimation can be set to be less than the number of antennas or the number of transmission beams for which channel information is to be estimated. In addition, in accordance with the present invention, it is possible to reduce overhead for the channel information and improve the throughput.

DESCRIPTION OF REFERENCE SIGNS

10 Access point
10-2 Long training frame generating circuit
10-3 Wireless signal transmitting/receiving circuit
10-4-1 to 10-4-N Transmit/receive antenna
10-5 Received signal demodulating circuit
10-6 Feedback information extracting circuit
10-7 Channel information acquiring circuit
10-8 Iterative coefficient setting circuit

The invention claimed is:

1. A wireless apparatus which estimates channel information between a plurality of transmission ports and receive antennas of a communication partner in communication based on an orthogonal frequency-division multiplexing scheme, the wireless apparatus comprising:
an iterative coefficient setting unit which sets an iterative coefficient representing the number of transmission ports which share a plurality of frequency channels of training signals for estimating the channel information for the plurality of transmission ports;
a training signal generating unit which allocates frequency channels to each transmission port so as to satisfy the iterative coefficient set by the iterative coefficient setting unit and generates L (L is a positive integer) training signals based on the allocated frequency channels;
a wireless transmitting unit which outputs the training signals generated by the training signal generating unit to transmit antennas;
a channel information acquiring unit which acquires channel information estimated from the training signals transmitted by the transmit antennas from the communication partner for the frequency channels allocated to each transmission port; and
a channel information interpolating unit which interpolates channel information of a remaining frequency channel other than the frequency channels allocated to each transmission port among the plurality of frequency channels from the acquired channel information.

2. The wireless apparatus according to claim 1, wherein the iterative coefficient setting unit sets iterative coefficients as $\beta_1$ to $\beta_M$ for M (M is a positive integer) transmission ports and sets the iterative coefficients $\beta_1$ to $\beta_M$ so that a sum of reciprocals of the iterative coefficients $\beta_1$ to $\beta_M$ becomes the integer L.

3. The wireless apparatus according to claim 1, wherein the training signal generating unit allocates frequency channels to each transmission port so as to satisfy the iterative coefficient, multiplies signals corresponding to the same frequency channel of the L training signals by an L×L transform matrix, and allocates obtained L signals to the L training signals, and
the wireless transmitting unit outputs the training signals generated by the training signal generating unit to the transmit antennas.

4. The wireless apparatus according to claim 1, wherein the iterative coefficient setting unit sets, for each transmission port, an iterative coefficient set for a transmission port in which a vector corresponding to a signal space estimated using a set matrix of channel matrices for the receive antennas of the communication partner previously estimated serves as a transmission weight to a value less than an iterative coefficient corresponding to a null space which is orthogonal to the vector corresponding to the signal space.

5. The wireless apparatus according to claim 3, wherein the iterative coefficient setting unit sets, for each transmission port, an iterative coefficient set for a transmission port in which a vector corresponding to a signal space estimated using a set matrix of channel matrices for the receive antennas of the communication partner previously estimated serves as a transmission weight to a value less than an iterative coefficient corresponding to a null space which is orthogonal to the vector corresponding to the signal space.

6. A training signal transmission method of a wireless apparatus which estimates channel information between a plurality of transmission ports and receive antennas of a communication partner in communication based on an orthogonal frequency-division multiplexing scheme, the training signal transmission method comprising:
an iterative coefficient setting step of setting an iterative coefficient representing the number of transmission ports which share a plurality of frequency channels of training signals for estimating the channel information for the plurality of transmission ports;
a training signal generating step of allocating frequency channels to each transmission port so as to satisfy the iterative coefficient set in the iterative coefficient setting step and generating L (L is a positive integer) training signals based on the allocated frequency channels;
a wireless transmitting step of outputting the training signals generated in the training signal generating step to transmit antennas;
a channel information acquiring step of acquiring channel information estimated from the training signals transmitted by the transmit antennas from the communication partner for the frequency channels allocated to each transmission port; and
a channel information interpolating step of interpolating channel information of a remaining frequency channel other than the frequency channels allocated to each transmission port among the plurality of frequency channels from the channel information acquired in the channel information acquiring step.

7. The wireless apparatus according to claim 2, wherein the training signal generating unit allocates frequency channels to each transmission port so as to satisfy the iterative coefficient, multiplies signals corresponding to the same frequency channel of the L training signals by an L×L transform matrix, and allocates obtained L signals to the L training signals, and
the wireless transmitting unit outputs the training signals generated by the training signal generating unit to the transmit antennas.

8. The wireless apparatus according to claim 2, wherein the iterative coefficient setting unit sets, for each transmission port, an iterative coefficient set for a transmission port in which a vector corresponding to a signal space estimated using a set matrix of channel matrices for the receive antennas of the communication partner previously estimated serves as a transmission weight to a value less than an iterative coefficient corresponding to a null space which is orthogonal to the vector corresponding to the signal space.

9. The wireless apparatus according to claim 7, wherein the iterative coefficient setting unit sets, for each transmission port, an iterative coefficient set for a transmission port in which a vector corresponding to a signal space estimated using a set matrix of channel matrices for the receive antennas of the communication partner previously estimated serves as a transmission weight to a value less than an iterative coefficient corresponding to a null space which is orthogonal to the vector corresponding to the signal space.

* * * * *